Sept. 5, 1950           A. F. VICTOR           2,521,427
SPINDLE
Filed Dec. 21, 1945                             2 Sheets-Sheet 2
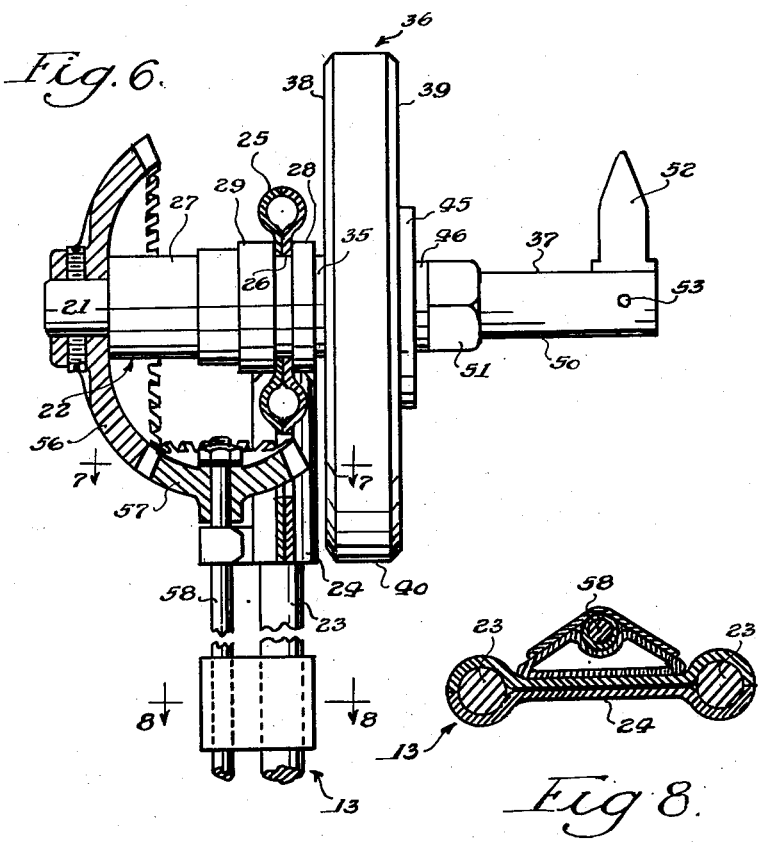
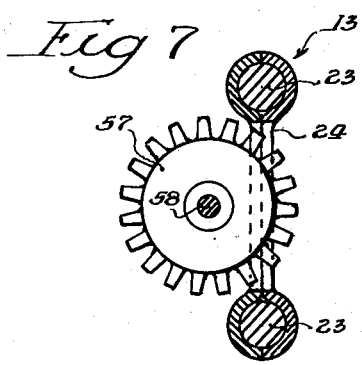
INVENTOR:-
Alexander F. Victor
By:- Spencer, Johnston, Cook & Root
atty's.

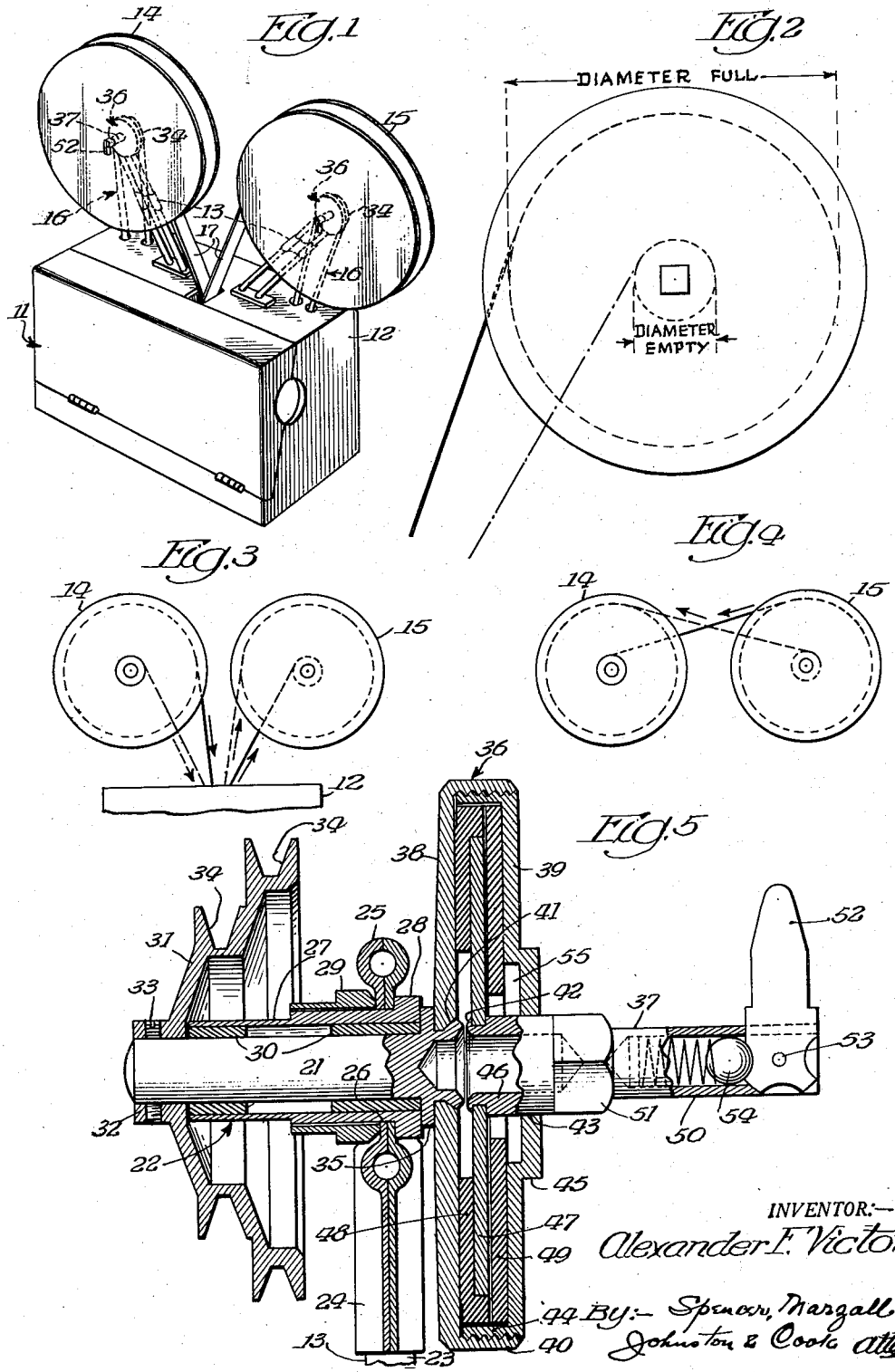

UNITED STATES PATENT OFFICE 2,521,427

SPINDLE

Alexander F. Victor, New York, N. Y., assignor to Victor Animatograph Corporation, Davenport, Iowa, a corporation of Delaware Application December 21, 1945, Serial No. 636,353

10 Claims. (Cl. 242—55)

The present invention relates in general to spindles, and has more particular reference to an improved variable speed spindle especially well adapted for carrying cinematograph film reels.

Cinematograph film is ordinarily stored, in wound condition, on conventional storage reels comprising a pair of spaced plates supported on a spindle receiving hub, on which an end of the film, also, may be attached, for winding. Film may be delivered, from a suitably mounted storage reel, for projection in suitable projector mechanism, the film being delivered from the projector and wound upon a take-up reel. The take-up and storage reels, for convenience, may be supported on the projector mechanism and driven thereby, each in a direction to feed film from the storage reel and to wind film onto the take-up reel. After all of the film on a storage reel has been projected and wound upon the take-up reel, it may be rewound upon the storage reel by reversing the reel driving mechanism.

The diameter of wound film on the storage reel normally decreases as the film is delivered therefrom to the projector, and the diameter of wound film on the take-up reel increases as film is received from the projector and wound upon the take-up reel. In order to maintain substantially constant linear speed of travel of film to and through the projecting mechanism, the rotary delivery speed of the storage reel must increase, while the rotary winding speed of the take-up reel must decrease, during the projection of the film, such rotary reel speeds varying in proportion to the changing diameter of wound film on said reels. During rewinding of the film directly from the take-up to the storage reel, the reverse speed variation of reels is necessary to accomplish linear film movement between the reels at substantially constant speed.

Film reels of the character mentioned, when in operation, are ordinarily supported on pulley driven reel spindles, operated by suitable driving mechanism commonly embodying flexible belts drivingly connected with the projection apparatus in order to turn the film reels at desired rotary speeds. Since it is not feasible, for economic considerations, to provide for varying the driven speed of the driving mechanism as the reels fill up and empty, said mechanisms are ordinarily driven at speeds determined by the operating speed of the projector, the required reel speed variation being accomplished by allowing the driving belts to slip on the driving pulleys.

Since the diameter of wound film progressively decreases on the storage reel, during film projection, and on the take-up reel, during rewinding, as the result of the delivery of film therefrom, it is necessary, if a constant linear rate of film delivery is maintained, to drive a delivery reel at a sufficiently slow rate to insure film delivery, without over-running the film receiver, when the delivery reel is full of film, as at the start of film projection or at the commencement of the rewinding operation. Since the diameter of wound film progressively increases on the take-up reel, during film projection, and on the storage reel, during rewinding, it is likewise necessary to drive the take-up reel, during film projection, and the storage reel, during rewinding, at a sufficiently rapid rate to receive film at the rate delivered by the projector mechanism, or by the take-up reel during the rewinding operation. Accordingly, it is necessary to drive a film delivery reel slower than its associated film receiving reel to insure that film may never be delivered more rapidly than it is taken up.

The driving mechanism, in short, should be operated so that the minimum driven film receiving rate is not lower than the maximum driven film delivery rate; and, during projection, the maximum driven film delivery rate should be no greater than the rate of delivery of film through the projector, while the minimum driven film receiving rate should be no less than the delivery rate of film through the projector. This may be accomplished by providing change speed means in the reel driving mechanism so that the take-up reel, during projection, will operate at a rate to receive film as rapidly, at the commencement of the projecting operation, as it is delivered from the projecting mechanism, while driving the storage reel no faster than is required, at the commencement of the projecting operation, to deliver film at the delivery rate thereof to the projecting mechanism.

The change speed means, upon reversal of the projector, for film rewinding purposes, may serve to drive the storage reel at a relatively rapid rate in the reverse direction in order to rewind film rapidly thereon from the take-up reel. If the take-up reel be driven during the rewinding operation, it is necessarily driven at a relatively slow rate with respect to the storage reel, in order, at the start of the rewinding operation, to deliver film from the outer portions of the reel at a rate no faster than is required to wind film upon the relatively rapidly turning storage reel at the central portions thereof. It is, of course, possible to disconnect the driving mechanism of the storage reel, during projection, and of the take-up reel, during rewinding, whereby the reel from which film is delivered may be free to turn and release film at whatever rate is required, thereby avoiding the problem of over-running so far as the film delivery reel is concerned. The film receiving reel, however, is always necessarily driven at a sufficiently rapid rate to receive the film thereon as rapidly as it is delivered thereto when the same is empty, as at the commencement of film projection, or at the commencement of the rewinding operation, if the take-up reel be a driven reel during the rewinding operation.

From the foregoing it will be seen that the projecting mechanism is required, under progressively increasing tension, to draw film from a driven storage reel, as the same becomes empty; while the take-up reel is required to draw the film from the projecting mechanism under progressively decreasing tension, as the take-up reel becomes filled. During rewinding operations, film is rewound initially relatively loosely upon the storage reel, and latterly with progressively increasing tension, as the storage reel becomes full and the take-up reel becomes empty.

As a consequence of the foregoing inherent character of reels driven at a substantially constant speed ratio, the film rewound on a storage reel tends to be loosely wound at the center of the reel and tightly packed in its outer portions. This is true whether the take-up reel is driven or is idle during the rewinding operation. If the reel is driven, the driving means, then in operation at relatively slow speed, serves as a brake. If the reel is idle, its inertia has a braking action. During projection, film delivered from the storage reel to the projector is drawn from the relatively tightly packed outer portions of the storage reel under relatively light tension and from the loosely wound central portions under relatively greater tension, if the storage reel be a driven reel, thus tending to tighten the loosely wound central turns, the one upon the other, as film is drawn from the storage reel. During rewinding, also, the loosely wound outer film turns on the take-up reel are returned under relatively slight tension to the storage reel and wound relatively loosely on the central portions thereof. Increasing film tension during rewinding, however, tends to wind each succeeding coil of film more and more tightly on the storage reel and tends to compress and tighten the previously and more loosely wound turns, the one upon the other. As a result of the foregoing unequal tightening effects, progressively increasing on one reel and decreasing on the other, film is subject to rapid deterioration through scratching, tearing and other damage. Appreciable belt slippage, also, is necessary at all times during film projection, although slippage is negligible when the take-up reel is empty, and is negligible during the initial period of film delivery from a full storage reel. Belt slippage is also appreciable during rewinding, being negligible in both reels only during the initial stages of the rewinding operation. Belt slippage tends to break or otherwise deteriorate the driving belts.

An important object of the present invention is to provide reel carrying means to enable film to be reeled under substantially uniform tension conditions; a further object being to provide reel carrying spindle means which allows the reel to turn at varying speeds, without undue or appreciable belt slippage.

Another important object is to provide a reel carrying spindle which will facilitate slippage when the reel is turning at slow speed, as compared with slippage when the reel is rotating at high speed.

Another important object is to provide a spindle embodying clutch mechanism allowing reel carrying portions of the spindle to slip and turn angularly with respect to pulley connected portions thereof.

Another important object is to provide a spindle having a driving portion, a reel carrying portion, and an interconnecting clutch mechanism, allowing relative angular slippage of the carrying portion with respect to the driving portion.

A further important object is to provide a compact and simplified slip clutch mechanism for drivingly interconnecting a reel carrying spindle portion with a driving member; a still further object being to provide fluid means within the clutch mechanism serving, through centrifugal action, to affect the slipping characteristics of the clutch as a function of its rotary speed.

The foregoing and numerous other important objects, advantages, and inherent functions of the invention will become apparent as the same is more fully understood from the following description, which, taken in connection with the accompanying drawings, discloses a preferred embodiment of the invention.

Referring to the drawings:

Fig. 1 is a perspective view of cinematograph film projecting apparatus embodying the present invention;

Fig. 2 is a diagrammatic view of a reel illustrating the kinematic relationships involved during the winding and unwinding of film on the reel;

Figs. 3 and 4 are diagrammatic views of storage and take-up reels showing relationships during film projection and rewinding;

Fig. 5 is a sectional view through a reel spindle embodying the present invention;

Fig. 6 is a view showing a modified construction embodying the invention; and

Figs. 7 and 8 are sectional views respectively taken on lines 7—7 and 8—8 in Fig. 6.

To illustrate the invention, the drawings show a cinematograph film projector 11 which may comprise any conventional or preferred projection mechanism. As shown, the projecting mechanism is enclosed in a box or casing 12 and has a pair of upstanding arms 13 for carrying a film storage reel 14 on one of the arms, in position to deliver film to the projection mechanism, and a take-up reel 15 on the other arm in position to receive projected film from the mechanism. The reels are mounted on suitable support means carried by the arms and driven by belts 16 connected with the projecting mechanism in the casing 12.

The end of the film 17 on the storage reel 14 may be threaded through the projecting mechanism and connected on the hub of the take-up reel 15, projection being accomplished thereafter by setting the projecting mechanism in operation. The projection mechanism, of course, includes mechanical means for drawing the film from the reel 14, and passing it through the projecting mechanism to the take-up reel 15 at a constant though adjustable linear rate of film speed.

Inspection of Fig. 2 of the drawings will reveal the kinematic relationships involved as a film reel is filled up or emptied. If film be delivered to or withdrawn from the reel at constant linear speed, it will be seen that, in order to maintain the film under constant tension, the reel when full must rotate at a slower speed than when empty, the rate of rotation being expressed by the formula:

$$R.P.M. = S/\pi D$$

Where:

R. P. M.=rotary speed of the reel
S=linear speed of film
D=outside diameter of wound film on reel.

The ratio $$\frac{R.P.M. \text{ (full)}}{R.P.M. \text{ (empty)}} = \frac{S/\pi D \text{ (full)}}{S/\pi D \text{ (empty)}} = \frac{D \text{ (empty)}}{D \text{ (full)}}$$

shows that rotary reel speed is inversely proportional to the diameter of wound film on the reel, that is to say, the reel, when full, must rotate proportionally more slowly than when empty, and vice versa, in order to deliver or receive film traveling at uniform linear speed under constant tension.

Since the reel 14 is driven in timed relation with the mechanism, it will unwind the film therefrom for delivery to the projecting mechanism at a speed proportional to the adjusted operating speed of the projector. It is desirable, however, that the reel 14 be driven at a speed such as to maintain the film under tension at all times as it is delivered from the reel, so that the delivered film will not over-run the projector.

The take-up reel 15, also, is preferably driven at a rate of speed such as to maintain the film at all times under slight tension as it is wound upon the take-up reel, so that film delivered by the projector will not over-run the take-up reel.

The storage reel consequently is desirably driven at a rate of rotation sufficiently slow to maintain the film being fed therefrom under slight tension during the initial delivery period from a full reel, the rate being such that film tension will increase progressively as the reel becomes empty. The take-up reel, on the other hand, is driven at all times at a sufficiently rapid rate of rotation to maintain film under at least slight tension as the reel becomes full, the rate being such that the film is under maximum tension during the initial stages of film winding on the take-up reel.

During rewinding of film from the take-up reel 15 directly onto the storage reel 14, as shown in Fig. 4, the film, delivered from the full take-up reel 15 having large wound film diameter, to the empty storage reel 14 having small winding diameter, will tend to wind loosely on the storage reel under minimum tension. As the take-up reel becomes empty, the diameter of wound film thereon decreases, but the winding diameter of film on the storage reel increases. Film tension, also, progressively increases during the rewinding procedure, with the result that the film is wound progressively more tightly on the storage reel as it becomes full. As a consequence, the rewound film on the storage reel 14 will be relatively loosely wound in the central portions of the reel and progressively more tightly wound in its outer portions.

As shown in Fig. 3, the storage reel 14, during film delivery to the projector, releases the outer tightly packed portions of wound film under relatively light tension, such tension progressively increasing as the centrally, relatively loosely wound film portions are delivered from the reel. In Fig. 3 is also shown how the film delivered to the take-up reel is wound tightly under appreciable tension at the central portions of the reel, film tension diminishing and winding being accomplished more loosely in the outer portions of the reel.

The present invention provides for minimizing the increase in film tension during winding, unwinding and rewinding of the film, and thus provides for the reeling of film under more nearly constant tension conditions, thereby greatly reducing film and belt deterioration, and accomplishing film projection and rewinding in smooth fashion, substantially without noise and vibration so frequently encountered in apparatus having conventional reel mechanism.

In accordance with the present invention, the reels 14 and 15 are each carried on spindle means comprising a shaft 21 journaled in bearing means 22 mounted on the support arm 13. To this end, the arm 13 may comprise a pair of rods 23 having ends fitted to and supporting a preferably sheet metal head 24 comprising a pair of stamped plates secured together and upon the rods 23 and having an annularly ribbed portion 25 formed with a central opening 26. A cylindrical bearing sleeve 27 is mounted in and through said opening, said sleeve having a flange 28 at one end and carrying a holding nut 29 threaded thereon adjacent the flange 28, whereby the sleeve may be clamped upon the head 24 and held upon the portion 25 by and between the flange and nut. The sleeve 27 is preferably provided internally with a pair of spaced bearing collars 30 secured in the opposite ends of the sleeve, the shaft 21 being journaled in said collars.

The opposite ends of the shaft 21 project at the opposite ends of the sleeve 27, one of said projecting shaft ends carrying pulley means 31 having a hub portion 32 secured to the shaft, as by means of a pin 33. The pulley means 31 may provide one or more pulley grooves 34, two grooves 34, one of which has greater diameter than the other, being shown in the illustrated embodiment. The opposite end of the shaft 21 may be provided with a flange 35 overlying the end of the sleeve 27, whereby the shaft is held against axial movement in the sleeve 27 by the engagement of the pulley hub 32 and the flange 35, respectively, with the opposed ends of the sleeve 27.

Outwardly of the flange 35 the shaft 21 is drivingly connected through friction clutch means 36 with a carrying spindle 37 adapted to receive and support the film reel. To this end, the clutch 36 comprises a pair of casting members 38 and 39, the member 38 comprising a plate having a circular, peripheral and preferably threaded flange 40, and a central opening 41, in which the end of the shaft 21, outwardly of the flange 35, is press fitted and secured in place, as by peening the end edges 42 of the shaft over upon a seat in the member 38 at the central opening thereof. The member 39, also, comprises a plate formed with a central opening 43 and a threaded peripheral flange 44 adapted for threaded engagement with the threaded flange 40 of the cooperating casing member 38. Outwardly of the opening 43 the central portions of the member 39 may be formed to provide a preferably hexagonal wrench engaging shoulder 45, while the outer surfaces of the flange 40 may be knurled, or otherwise roughened, to permit the parts to be threadedly interconnected, as by grasping the knurled rim of the member 38 and threading the member 39 therein, as by means of a wrench applied to the wrench engaging portions 45.

The reel carrying spindle 37 may comprise a shaft having a cylindrical head 46 adapted to extend through the opening 43 and into the casing formed by the threadedly interconnected members 38 and 39. The head 46 of the spindle carries a preferably metal clutch disk 47 within the casing 36, said disk 47 being formed with a central opening seated upon a shoulder formed at the end of the head 46 and secured in place by peening the end edges of the head over upon the disk 47. The clutch casing 36 also encloses a pair of friction disks 48 and 49, which may comprise suitable fiber or other clutch plate material. The disks 48 and 49 extend within said casing on opposite sides of the clutch disk 47, the disk 48 having a peripheral flange extending around the marginal edge of the disk 47. The spindle 37 has a reel carrying portion extending outwardly of the clutch casing 36. This reel carrying portion is preferably cylindrical, as shown at 50, but has a non-circular, preferably square shouldered portion 51 adjacent the head 46 and adapted to interfit with a corresponding non-circular opening of the reel, to drivingly engage the same. The cylindrical spindle portion 50, however, is preferably formed with an axial cavity, opening at the end of the spindle, said end being diametrally slotted to receive a holding finger 52 which is mounted on a pin 53 for pivotal movement at the slotted end of the spindle. The finger 52 may be moved into axial alinement with the spindle in order to allow a reel to be mounted on or removed from the spindle; and the finger may also be turned in either direction on its pivot pin into position at right angles with respect to the axis of the spindle, in order to retain a mounted reel thereon. The finger may be held in any of its adjusted positions by means of a latch comprising a ball 54 mounted within the spindle cavity immediately behind the finger 52, said ball being yieldingly pressed in the cavity toward and into locking engagement with notched portions of the finger, as by means of a spring in said cavity, for the purpose of yieldingly holding the finger in any of its adjusted positions.

The casing 36 is preferably charged with fluid, such as lubricating oil, and, if desired, a suitable annular packing ring 55, having generally L-shaped sectional configuration, may be enclosed within the casing 36 around the head portion 46 of the reel mounting shaft, to prevent liquid seepage along said head and through the casing opening 43. The lubricating liquid promotes slippage of the clutch disk 47 with respect to the plates 48 and 49 and may operate, to a limited extent, as a fluid drive medium allowing the clutch to slip more freely at low speed and less freely at high speeds, to accommodate the variable slip requirements during the reeling and unreeling of cinematograph film.

As an alternate arrangement, as shown in Figs. 6, 7, and 8, the pulley means 34 and driving belts 16 may be replaced by other suitable driving means, such as a preferably bevelled gear 56 on the shaft 21, in place of the pulley means 34, and meshing with a cooperating preferably bevelled gear 57 on a drive shaft 58, journaled on the arm 13 and adapted to be driven by the projector mechanism. In such an arrangement, the drive shaft 58 is driven by the projector mechanism and in turn drives the reel spindle 37 through the driving connection afforded by the bevelled gears 56 and 57, the shaft 21, and the clutch means 36.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. A reel support structure comprising bearing means, a stub shaft member turnably mounted in said bearing means, a driving wheel on said shaft, a reel mounting stem member in axial alinement with said stub shaft in position to support a reel thereon, and slip clutch means drivingly interconnecting said stub shaft and mounting stem members, said slip clutch means comprising a shell and a cover threadedly interconnected with said shell to form a cylindrical casing, a clutch plate secured in said casing, and a clutch disk enclosed within said casing in position to frictionally and slippingly engage said clutch plate, said disk and plate being disposed in facing relationship between said shell and cover, said shell being secured on one of said members and said disk being drivingly secured to said other member in position extending through a central opening in said cover.

2. A reel support structure comprising bearing means, a stub shaft member turnably mounted in said bearing means, a driving wheel on said shaft, a reel mounting stem member in axial alinement with said stub shaft in position to support a reel thereon, slip clutch means drivingly interconnecting said stub shaft and mounting stem members, said slip clutch means comprising a shell and a cover threadedly interconnected with said shell to form a cylindrical casing adapted to contain lubricating oil, a clutch plate secured in said casing, and a clutch disk enclosed within said casing in position to frictionally and slippingly engage said clutch plate, said disk and plate being disposed in facing relationship between said shell and cover, said shell being secured on one of said members and said disk being drivingly secured to said other member in position extending through a central opening in said cover, and means to seal said opening against the escape of oil around the member extending therethrough.

3. A reel support structure comprising a pair of rods and sheet metal clip means rigidly securing said rods in spaced apart parallel relationship to form a support arm, bearing means supported on said clip means, a stub shaft member turnably mounted in said bearing means, a driving wheel on said shaft, a reel mounting stem member in axial alinement with said stub shaft in position to support a reel thereon, and slip clutch means drivingly interconnecting said stub shaft and mounting stem members, said slip clutch means comprising a shell and a cover threadedly interconnected with said shell to form a cylindrical casing, a clutch plate secured in said casing, and a clutch disk enclosed within said casing in position to frictionally and slippingly engage said clutch plate, said shell being secured on one of said members and said disk being drivingly secured to said other member in position extending through a central opening in said cover.

4. A reel support structure comprising bearing means, a stub shaft member turnably mounted in said bearing means and having portions extending outwardly of said bearing means at the opposite ends thereof, a driving wheel on said shaft, at one side of said bearing means, a reel mounting stem member in axial alinement with said stub shaft in position to support a reel thereon, and slip clutch means drivingly interconnecting said mounting stem member with said stub shaft member at the side of the bearing means remote from said wheel, said slip clutch means comprising a shell and a cover and threaded means adjustably interconnecting said cover with said shell to form a cylindrical casing, a clutch plate secured in said casing, and a clutch disk enclosed within said casing in position to frictionally and slippingly engage said clutch plate, said shell being secured on one of said members and said disk being drivingly secured to said other member in position extending through a central opening in said cover.

5. A reel support structure comprising bearing means, a stub shaft member turnably mounted in said bearing means and having portions extending outwardly of said bearing means at the opposite ends thereof, a driving wheel forming a belt pulley on said shaft, at one side of said bearing means, a reel mounting stem member in axial alinement with said stub shaft in position to support a reel thereon, and slip clutch means drivingly interconnecting said mounting stem member with said stub shaft member at the side of the bearing means remote from said wheel, said slip clutch means comprising a shell and a cover and threaded means adjustably interconnecting said cover with said shell to form a cylindrical casing, a clutch plate secured in said casing, and a clutch disk enclosed within said casing in position to frictionally and slippingly engage said clutch plate, said shell being secured on one of said members and said disk being drivingly secured to said other member in position extending through a central opening in said cover.

6. A reel support structure comprising a pair of rods and sheet metal clip means rigidly securing said rods in spaced apart parallel relationship to form a support arm, bearing means, a stub shaft member turnably mounted in said bearing means and having portions extending outwardly of said bearing means at the opposite ends thereof, a driving wheel on said shaft, at one side of said bearing means, said wheel providing beveled gear teeth, a driving shaft turnably mounted in bearings carried by said clip means, a beveled driving pinion on said driving shaft in position to drivingly engage the teeth of said wheel, a reel mounting stem member in axial alinement with said stub shaft in position to support a reel thereon, and slip clutch means drivingly interconnecting said mounting stem member with said stub shaft member at the side of the bearing means remote from said wheel, said slip clutch means comprising a shell and a cover and threaded means adjustably interconnecting said cover with said shell to form a cylindrical casing, a clutch plate secured in said casing, and a clutch disk enclosed within said casing in position to frictionally and slippingly engage said clutch plate, said shell being secured on one of said members and said disk being drivingly secured to said other member in position extending through a central opening in said cover.

7. A reel support structure for cinematographic apparatus comprising a pair of rods and a sheet metal clip rigidly securing said rods in spaced apart parallel relationship to form a support arm, said clip comprising cooperating plates secured together in facing relation to clampingly receive the rods therebetween, said plates having registering annularly grooved portions forming a toric ring structure in said clip, bearing means supported on said clip within said ring structure, a stub shaft turnably mounted in said bearing means and having portions extending outwardly of said bearing means at the opposite ends thereof, a driving wheel on said shaft, on one side of said bearing means, a reel mounting stem in axial alinement with said stub shaft in position to detachably support a reel thereon, and slip clutch means drivingly interconnecting said mounting stem member with said stub shaft member on the side of the bearing means remote from said wheel.

8. A reel support structure for cinematographic apparatus comprising a pair of rods and a sheet metal clip rigidly securing said rods in spaced apart parallel relationship to form a support arm, said clip comprising cooperating plates secured together in facing relation to clampingly receive the rods therebetween, said plates having registering annularly grooved portions forming a toric ring structure in said clip, bearing means supported on said clip within said ring structure, a stub shaft turnably mounted in said bearing means and having portions extending outwardly of said bearing means at the opposite ends thereof, a driving wheel forming a belt pulley on said shaft, on one side of said bearing means, a reel mounting stem in axial alinement with said stub shaft in position to detachably support a reel thereon, said mounting stem having means thereon operable to secure a reel on said stem, and slip clutch means drivingly interconnecting said mounting stem member with said stub shaft member at the side of the bearing means remote from said wheel, said slip clutch means comprising a shell and a cover and threaded means adjustably interconnecting said cover with said shell to form a cylindrical casing, a clutch plate secured in said casing, and a clutch disk enclosed within said casing in position to frictionally and slippingly engage said clutch plate, said shell being secured on one of said members and said disk being drivingly secured to said other member in position extending through a central opening in said cover.

9. A reel support structure for cinematographic apparatus comprising a pair of rods and a sheet metal clip rigidly securing said rods in spaced apart parallel relationship to form a support arm, said clip comprising cooperating plates secured together in facing relation to clampingly receive the rods therebetween, said plates having registering annularly grooved portions forming a toric ring structure in said clip, bearing means supported on said clip within said ring structure, a stub shaft turnably mounted in said bearing means and having portions extending outwardly of said bearing means at the opposite ends thereof, a driving wheel providing beveled gear teeth on said shaft, at one side of said bearing means, a driving shaft turnably mounted in bearings carried by said clip, a beveled driving pinion on said driving shaft in position to drivingly engage the teeth of said wheel, a reel mounting stem in axial alinement with said stub shaft in position to detachably support a reel thereon, said mounting stem having means thereon operable to secure a reel on said stem, and slip clutch means drivingly interconnecting said mounting stem member with said stub shaft member at the side of the bearing means remote from said wheel, said slip clutch means comprising a shell and a cover and threaded means adjustably interconnecting said cover with said shell to form a cylindrical casing, a clutch plate secured in said casing, and a clutch disk enclosed within said casing in position to frictionally and slippingly engage said clutch plate, said shell being secured on one of said members and said disk being drivingly secured to said other member in position extending through a central opening in said cover.

10. A reel support structure for cinematographic apparatus comprising a pair of rods and a sheet metal clip rigidly securing said rods in spaced apart parallel relationship to form a support arm, said clip comprising cooperating plates secured together in facing relation to clampingly receive the rods therebetween, said plates having registering annularly grooved portions forming a toric ring structure in said clip, bearing means supported on said clip within said ring structure, a stub shaft turnably mounted in said bearing means and having portions extending outwardly of said bearing means at the opposite ends thereof, a driving wheel on said shaft, at one side of said bearing means, a reel mounting stem in axial alinement with said stub shaft in position to detachably support a reel thereon, said mounting stem having means thereon operable to secure a reel on said stem, and slip clutch means drivingly interconnecting said stub shaft and mounting stem members, said slip clutch means comprising a cylindrical casing adapted to contain lubricating oil and secured on one of said members, a clutch plate secured in said casing, and a clutch disk enclosed within said casing in position to frictionally and slippingly engage said clutch plate, said disk extending outwardly of said casing through an axial opening in a wall thereof and being drivingly secured to said other member, and means to seal said opening against the escape of oil around the member extending therethrough.

ALEXANDER F. VICTOR.

REFERENCES CITED

The following references are of record in the file of this patent:

UNITED STATES PATENTS

| Number | Name | Date |
|---|---|---|
| 458,408 | Schwanhausser | Aug. 25, 1891 |
| 773,005 | Dreses | Oct. 25, 1904 |
| 1,240,560 | Gilmore | Sept. 18, 1917 |
| 1,277,559 | Emory | Sept. 3, 1918 |
| 1,302,701 | Parret | May 6, 1919 |
| 1,425,305 | White | Aug. 8, 1922 |
| 1,525,990 | Howell | Feb. 10, 1925 |
| 1,898,469 | Tonsor | Feb. 21, 1933 |
| 2,083,646 | Fuller | June 15, 1937 |
| 2,087,863 | Sharp | July 20, 1937 |
| 2,343,961 | Del Valle | Mar. 14, 1944 |

FOREIGN PATENTS

| Number | Country | Date |
|---|---|---|
| 19,710 | Australia | of 1934 |
| 638,968 | Germany | Nov. 26, 1936 |